(12) United States Patent
Chang et al.

(10) Patent No.: US 9,080,916 B2
(45) Date of Patent: Jul. 14, 2015

(54) CORRECTION FACTOR FOR COLOR RESPONSE CALIBRATION

(75) Inventors: Edward T. Chang, Saratoga, CA (US); Scott T. Smith, San Jose, CA (US); Damien J. Thivent, San Francisco, CA (US); Richard L. Baer, Los Altos, CA (US); Paul M. Hubel, Mountain View, CA (US)

(73) Assignee: Apple Inc., Cupertino, CA (US)

(*) Notice: Subject to any disclaimer, the term of this patent is extended or adjusted under 35 U.S.C. 154(b) by 520 days.

(21) Appl. No.: 13/600,057

(22) Filed: Aug. 30, 2012

(65) Prior Publication Data
US 2014/0063283 A1 Mar. 6, 2014

(51) Int. Cl.
G01J 3/50 (2006.01)
H04N 9/04 (2006.01)
H04N 17/00 (2006.01)
G01J 3/46 (2006.01)

(52) U.S. Cl.
CPC .............. *G01J 3/505* (2013.01); *H04N 9/045* (2013.01); *H04N 17/002* (2013.01); *G01J 2003/467* (2013.01)

(58) Field of Classification Search
USPC .......... 382/162, 167; 358/505, 518–519, 1.9; 348/187, 189, 254
See application file for complete search history.

(56) References Cited

U.S. PATENT DOCUMENTS

| | | | |
|---|---|---|---|
| 4,679,074 A * | 7/1987 | Sugiura et al. ............. 358/523 |
| 6,654,048 B1 * | 11/2003 | Barrett-Lennard et al. .. 348/180 |
| 6,954,547 B2 * | 10/2005 | Matsushiro et al. ......... 382/162 |
| 7,012,633 B2 * | 3/2006 | Jenkins ..................... 348/180 |
| 7,184,173 B2 * | 2/2007 | Chu et al. .................. 358/1.9 |
| 7,260,258 B2 * | 8/2007 | Foote et al. ................ 382/167 |
| 7,286,166 B2 | 10/2007 | Smith et al. |
| 7,477,294 B2 * | 1/2009 | Lohweg et al. ........... 348/223.1 |
| 7,538,870 B2 * | 5/2009 | Imura ........................ 356/326 |

(Continued)

FOREIGN PATENT DOCUMENTS

| | | |
|---|---|---|
| JP | 3792619 B2 | 2/2004 |
| KR | 20110118377 A | 10/2011 |
| WO | WO-03001163 A2 | 1/2003 |

OTHER PUBLICATIONS

CN Search Report (dated Feb. 2, 2015), Application No. 201310384973.5, Date Filed—Aug. 30, 2013, (4 pages).

(Continued)

*Primary Examiner* — Ishrat I Sherali
(74) *Attorney, Agent, or Firm* — Blakely, Sokoloff, Taylor & Zafman LLP

(57) ABSTRACT

The color response of camera devices may be calibrated, using a correction factor that can account for differences in the spectra of light emitted by different light sources used during calibration. The correction factor may be calculated based on the expected spectral sensitivities of the camera devices, the power spectrum of an actual light source, and the power spectrum of a canonical light source. The correction factor is then applied to adjust a measured color response of a given camera device, so that the adjusted color response is effectively the response of the given camera device if it had been illuminated by the canonical light source. In this manner, any measured color response differences, which may be due to differences between the actual light source used and the canonical light source, can be effectively reduced (if not essentially eliminated.) Other embodiments are also described and claimed.

20 Claims, 7 Drawing Sheets

(56) References Cited

U.S. PATENT DOCUMENTS

| | | | |
|---|---|---|---|
| 7,728,845 | B2 | 6/2010 | Holu |
| 7,796,171 | B2 * | 9/2010 | Gardner .................. 348/254 |
| 7,864,369 | B2 * | 1/2011 | Olszak et al. ............. 358/1.9 |
| 7,974,466 | B2 | 7/2011 | Pearson et al. |
| 7,999,978 | B2 * | 8/2011 | Nakamura et al. ........... 358/518 |
| 8,044,969 | B2 * | 10/2011 | Osorio et al. ............. 345/604 |
| 8,587,690 | B2 * | 11/2013 | Lee ..................... 348/223.1 |
| 2010/0271489 | A1 | 10/2010 | Muukki |
| 2010/0271503 | A1 | 10/2010 | Safaee-Rad et al. |
| 2011/0058072 | A1 | 3/2011 | Wang et al. |
| 2012/0188402 | A1 | 7/2012 | Guo et al. |
| 2012/0314086 | A1 | 12/2012 | Hubel et al. |
| 2013/0229530 | A1 | 9/2013 | Hubel et al. |

OTHER PUBLICATIONS

Singapore Search Report (dated Jun. 13, 2014), Application No. 201306121-3, Application Filing Date—Aug. 13, 2013, (7 pages).

Singapore Examination Report (dated Jun. 13, 2014), Application No. 201306121-3, Application Filing Date—Aug. 13, 2013, -Supersedes Singapore Search Report which had missing page(s), (10 pages).

Han, Shuai, et al., "Camera Spectral Sensitivity Estimation from a Single Image under Unknown Illumination by using Fluorescence", IEEE Conference on Computer Vision and Pattern Recognition (CVPR), (Jun. 16-21, 2012), 805-812.

Joshi, Neel, et al., "Automatic Color Calibration for Large Camera Arrays", UCSD CSE Tech Report CD2005-0821, (May 2005), 4 pages.

* cited by examiner

ACTUAL LIGHT SOURCE SPD GRAPH 32

COLOR VALUES FOR COLOR RESPONSE TO ACTUAL LIGHT SOURCE
30

$$R_j = \sum E_j(\lambda) \cdot D_R(\lambda) \quad (36)$$

$$G_j = \sum E_j(\lambda) \cdot D_G(\lambda) \quad (37)$$

$$B_j = \sum E_j(\lambda) \cdot D_B(\lambda) \quad (38)$$

CANONICAL LIGHT SOURCE SPD GRAPH 33

COLOR VALUES FOR COLOR RESPONSE TO CANONICAL LIGHT SOURCE
35

$$R_0 = \sum E_0(\lambda) \cdot D_R(\lambda) \quad (39)$$

$$G_0 = \sum E_0(\lambda) \cdot D_G(\lambda) \quad (40)$$

$$B_0 = \sum E_0(\lambda) \cdot D_B(\lambda) \quad (41)$$

CORRECTION FACTOR FOR COLOR RESPONSE CALIBRATION

FIELD

Embodiments of the invention relate to calibrating the color response of an imaging system. More particularly, an embodiment of the invention relates to correcting for differences in light sources used during color response calibration. Other embodiments are also described.

BACKGROUND

Digital imaging systems (e.g., cameras) have quickly become a standard feature for consumer electronic portable devices including portable multimedia players, smart phones, laptops, and tablet computers. The image quality expected from these portable cameras has grown, as cameras with higher quality optics and higher resolution sensors are being incorporated into such small devices. As portable device dimensions shrink, so do the dimensions of the incorporated camera modules. At such small scales, mass produced camera modules become more susceptible to image quality degradation due to slight deviations and/or contaminations in the optical components introduced during manufacture and imaging system assembly. For example, a camera module's reproduction of color varies as a consequence of variations in its constituent image sensor, lens, and infrared filter. For mass production of high quality camera modules, it is important that the color response is accurate and consistent across camera modules.

In order to achieve accurate and consistent color reproduction, the color response of a camera module may be calibrated during manufacture testing. Calibration usually involves measuring the color response of a camera module under a fixed set of conditions (e.g., a fixed illuminant) and recording those values. The color response values are then compared to those of an "ideal" module, to derive correction factors. The correction factors are then stored with each specimen of the module, and are automatically applied to each picture that is taken during end-user or in-the-field use.

When calibrating the color response, the color response measurements of the camera device under test (DUT) and those of the ideal module should be taken under the same lighting conditions. Ideally the color response of the DUT and the color response of the ideal module are measured while using the same light source. However, this is unrealistic for mass production environments because often times, not all camera modules are calibrated at the same location. For example, in high volume manufacture, the calibration of the specimens of a given camera module design may have to take place at different factories or at different production lines within a factory. Reproducing the exact same lighting conditions each time can be difficult because the power spectrum or spectral distribution of light emitted by even the same brand and model of light source may vary. Some of this variation may be controlled by adjusting all of the light sources to the same color temperature.

SUMMARY

It has been discovered that almost any two light sources of the same brand and model that have been adjusted to the same color temperature setting can still evoke different color responses, from the same camera module. As a practical matter, for most light sources, the spectrum of their light is not sufficiently adjustable. Thus, a mechanism is needed to account for the residual errors that remain in the color responses of camera devices that are being calibrated (despite having matched color temperatures between the light sources.)

The color response of camera devices can be calibrated using a correction factor (also referred to as a residual error correction factor) that may be computed for a given camera DUT during manufacture testing, and that may account for differences in the spectra of light emitted by light sources (that may be of the same brand and model and have the same color temperature setting) used for testing other camera devices having the same specification. The correction factor may then be applied to adjust a measured color response of the DUT (while the DUT is imaging an actual light source), and then stored in non-volatile memory within the camera DUT as a corrected color response. The latter may then be read by camera firmware each time an image is captured by the DUT during in-the-field use, and applied to the image to perform color correction (prior to saving the image as a user-accessible image file.) This enables digital camera devices (of the same specification) that are taking pictures of a given scene to exhibit essentially the same color response, despite having been calibrated using light sources that may have had different color spectra.

As explained below, in one embodiment of the invention, the correction factor is designed so that the corrected color response is the color response had the camera DUT been illuminated by a "canonical" light source which may be viewed as having a fixed spectrum (in contrast to different instances of an actual light source). In other words, the color response of the specimens or DUTs (having the same specification) can be deemed to have been calibrated using the canonical light source, since any differences in color response that may be due to differences in the actual light sources used can be substantially reduced or even essentially eliminated. An advantage here is that accurate and consistent calibration of color response may be achieved by applying the correction factor, despite the calibration processes having been performed with different light sources.

A correction factor may be calculated by computing a ratio of a camera DUTs color response to a canonical light source, and its color response to an actual light source. The color response to a canonical light source may be calculated based on the expected spectral sensitivity of the camera DUT and the power spectrum of the canonical light source. Likewise, the color response to the actual light source may be calculated based on the expected spectral sensitivity of the camera DUT and the power spectrum of the actual light source.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

This document discloses embodiments of systems and processes to correct for variation in light sources used during color response calibration of camera modules, by computing a residual error correction factor.

Figure 1:
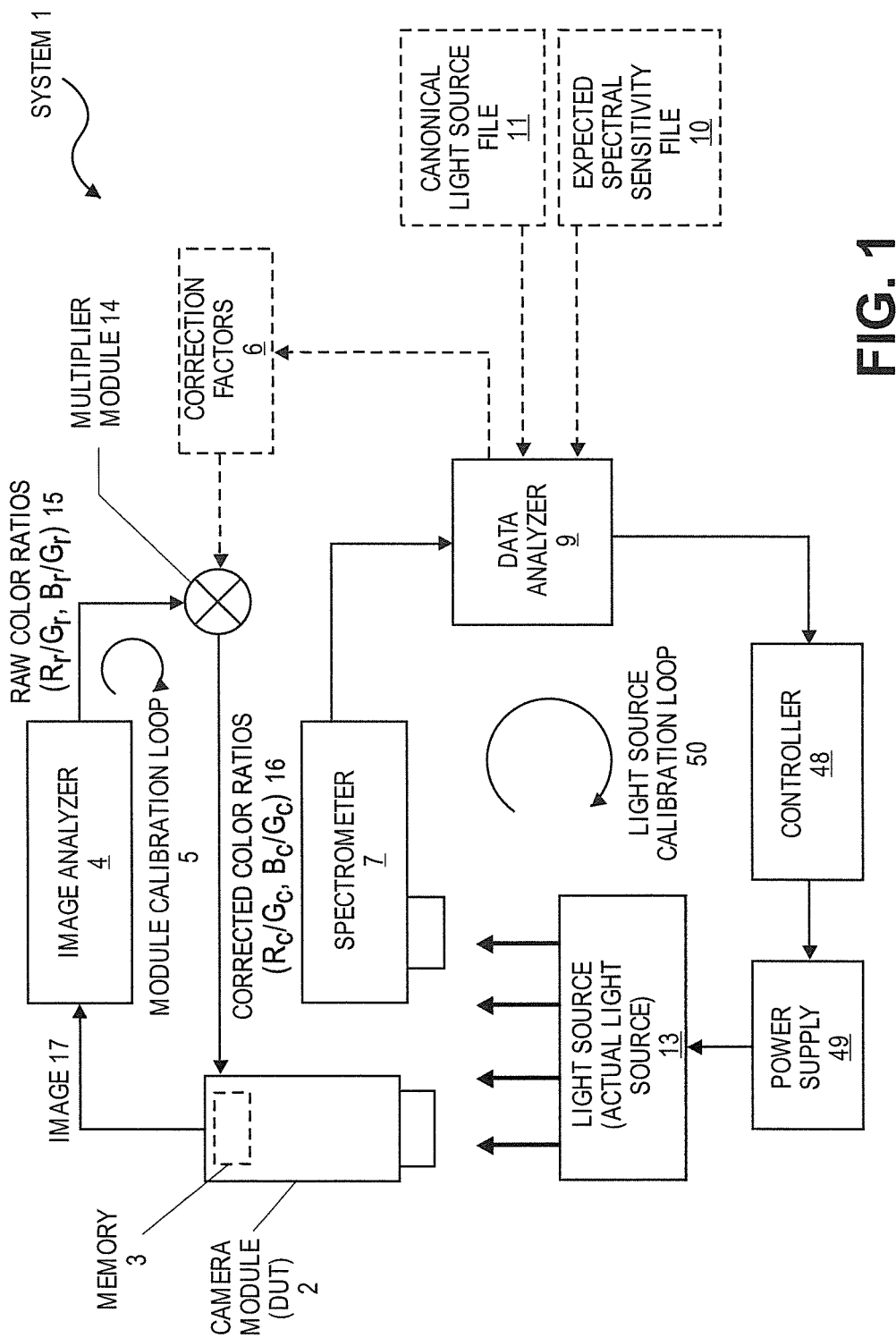
FIG. 1 is a representation of a system that may be used to calibrate color response of a camera module, in accordance with embodiments of the invention.

FIG. 1 is a representation of a system that can be used to measure the color response of a camera module 2. A camera module 2, which is the device under test (DUT), is exposed to a light source 13. An image is captured using the DUT 2 and a measured color response may be computed from the image by an image analyzer 4.

Color response may be characterized as a ratio of at least two different pixel color components or color channels. For example, in one embodiment, the color response of an RGB camera module may be characterized as the color ratios R/G and B/G computed from one or more images captured by the module. Other color channels and ratios are contemplated as well.

Calibrating the color response involves comparing the color response of a DUT 2 to the color response of an "ideal" camera module under a fixed set of conditions. The "ideal" camera module may be selected as a camera module that produces images with a desired color response. To perform accurate and consistent color response calibration, the color response measurements of a DUT 2 and the "ideal" camera module should be obtained while using identical light sources because the color response of a camera module 2 can vary depending on the spectral content characteristics of the light emitted by the light source 13. However, as a practical matter, it is difficult to reproduce the exact spectrum produced by a light source 13 because in most cases, the spectrum of a light source is not sufficiently adjustable. Even two light sources of the same brand and model that have been adjusted to the same color temperature setting can still evoke different color responses, from the same camera module 2. Thus, there is a need for a color response calibration that can account for the differences in the spectra of light emitted by light sources used during color response calibration.

An embodiment of this invention adjusts color response measurements using a correction factor (also referred to here as a residual error correction factor) to account for differences in light sources used during calibration. Although it is difficult to accurately reproduce a light source, it is possible to accurately and consistently measure the spectrum of a light source to a sufficient degree of precision. Instead of attempting to reproduce a light source, which can be difficult and laborious, an embodiment of the invention measures the difference between the spectrums of different light sources to calculate a correction factor. The measured color response of a DUT 2 exposed to an actual light source 13 can be adjusted using a correction factor to obtain the color response of the DUT 2 had it been exposed to a "canonical" light source. Thus, any color response variation due to the difference between the actual light source 13 and the canonical light source may be essentially eliminated or substantially reduced.

An "actual light source" as used herein, refers to an actual or physical light source used during color response measurement of a DUT 2. In one embodiment, the actual light source 13 may contain a tungsten incandescent lamp. In another embodiment, the actual light source 13 may contain a simulated daylight lamp. In another embodiment, the actual light source 13 may be a scene or target that reflects light from a lamp.

A "canonical light source" as used herein, refers to mathematically derived characteristics of a light source that is to be used as a fixed common or reference light source. In one embodiment, a canonical light source may be represented as a measure of power carried by each frequency or color (or "power spectrum" generally) that has been derived from several measured power spectra of lamps that are similar to those used in the actual light source 13. In other words, the canonical light source may be defined as representing a light source that emits light spectra similar to that of several specimens of the actual light source 13. For example, the power spectrum of the canonical light source may be derived from a measured power spectrum of a number of tungsten incandescent lamps, simulated daylight lamps, or other actual lamps that are similar to the one contained in the actual light source 13. This may include lamps of the same type or model, that are from the same manufacturer, and that have been set to the same color temperature setting.

Figure 2:
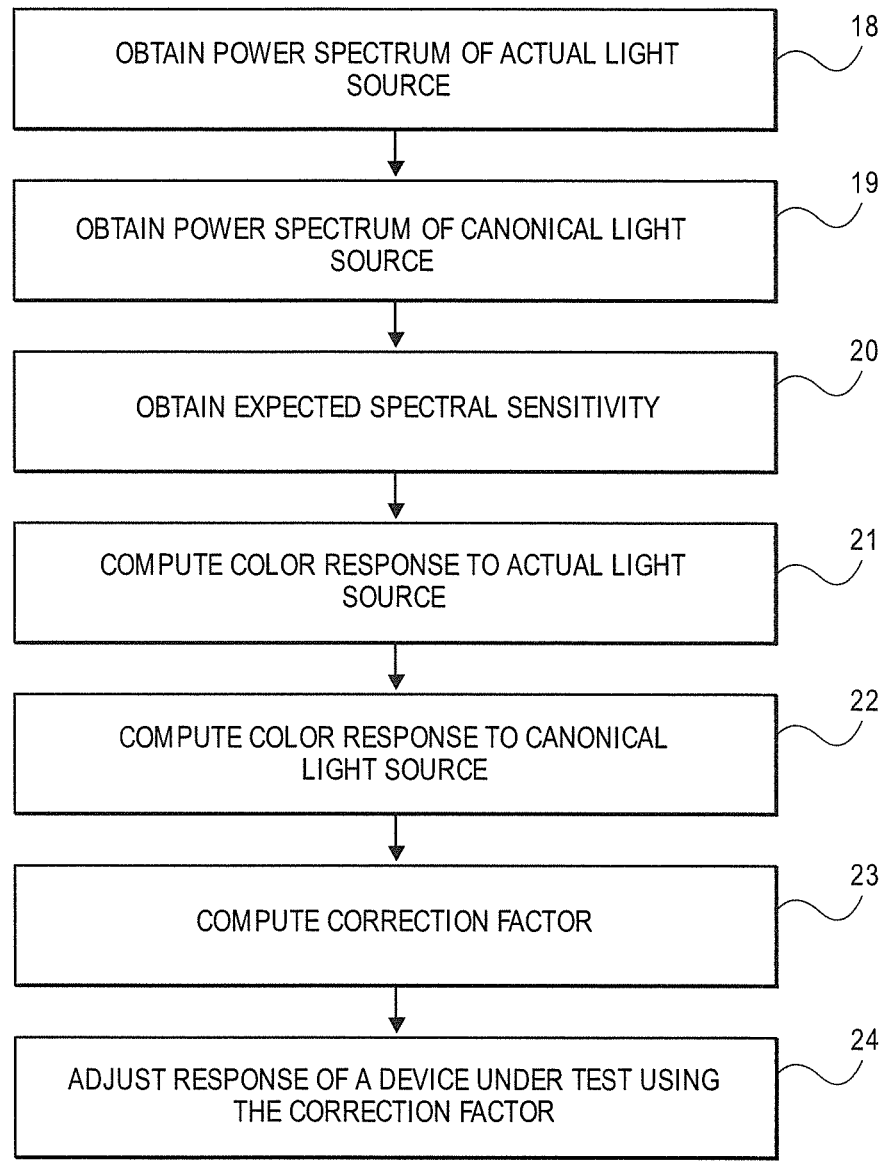
FIG. 2 is a flowchart of a process for adjusting response of a camera module, in accordance with embodiments of the invention.

FIG. 2 is a flowchart of an illustrative process for adjusting a response of a DUT 2 using a computed residual error correction factor, according to embodiments of the invention. It should be understood that while the following descriptions of the flowchart in FIG. 2 primarily describe adjusting a color response, e.g., as several color ratios computed from a digital image captured by a DUT 2, those skilled in the art will appreciate that alternative measures of how a camera responds to color may also be adjusted using a similar technique.

In block 18, a power spectrum of the actual light source 13 is obtained. In one embodiment, the power spectrum is a spectral power distribution (SPD). The power spectrum of the actual light source may be obtained by reading a spectrometer 7 or a similar device that is exposed to the actual light source 13. In one embodiment, the power spectrum of the actual light source 13 is measured once for several DUTs to be tested, and may be repeated at regular intervals; alternatively it could be measured separately for each DUT. For example, the power spectrum of the actual light source 13 may be measured once every 24 hours during a production run, and saved, for example, in a file or in a memory. The stored power spectrum may then be retrieved to calibrate successive DUTs 2 until the next power spectrum measurement occurs. In another embodiment, power spectrum is measured on demand by a user. How often the power spectrum of the actual light source 13 needs to be measured depends on the rate of degradation of the light emitted by the light source 13 over time. For example, measurements may need to be made more often for light sources 13 that degrade quickly.

In block 19, a power spectrum of a canonical light source is obtained. In one embodiment, the power spectrum is a SPD. The power spectrum of a canonical light source may be derived from a measured power spectrum of several instances of a tungsten incandescent lamp, a simulated daylight lamp, or other lamp that is similar to the lamp contained in the actual light source 13. The power spectrum of the canonical light source is usually predetermined and may be obtained from storage as a file or a memory containing data about the power spectrum of the canonical light source.

In block 20, an expected spectral sensitivity is obtained for several specimens of the same digital color camera specification as the DUT. Expected spectral sensitivity may be obtained for each color component (e.g., R, G, and B). In one embodiment, an expected spectral sensitivity may be obtained by measuring the spectral sensitivity of a principal camera device. A principal camera device may be an actual or a hypothetical camera device that can be selected from or derived from a statistical distribution of actual camera devices having similar specification. For example, the expected spectral sensitivity may be derived for a principal camera device that may be selected as an average acceptable camera module from a statistical distribution of camera modules having similar specification as the DUTs 2 to be calibrated. In one embodiment, expected spectral sensitivity may be measured by analyzing a digital image captured by a principal camera device as illuminated by a monochromatic light source whose color can be swept over the desired range for the DUTs. The expected spectral sensitivities may be predetermined and stored, such as in a file or a memory which contains data about the expected spectral sensitivities.

In one embodiment, the expected spectral sensitivities may be obtained by measuring the spectral sensitivities of the DUT 2 itself. Using the spectral sensitivities of the DUT 2 itself for computing a correction factor may yield more accurate calibration. However, because the spectral sensitivities appear in both the numerator and denominator of the correction factor formula (described below), deviations in the spectral sensitivities across DUTs are expected to have only a second order effect. Thus, using predetermined spectral sensitivities of a principal camera device (instead of the spectral sensitivities of the DUT 2 itself) to calibrate each DUT 2 may still achieve good calibration. An advantage here is that the spectral sensitivities of each individual DUT 2 need not be measured. This allows for faster calibration because measuring the spectral sensitivities of each DUT 2 can be laborious and time consuming.

Figure 3:
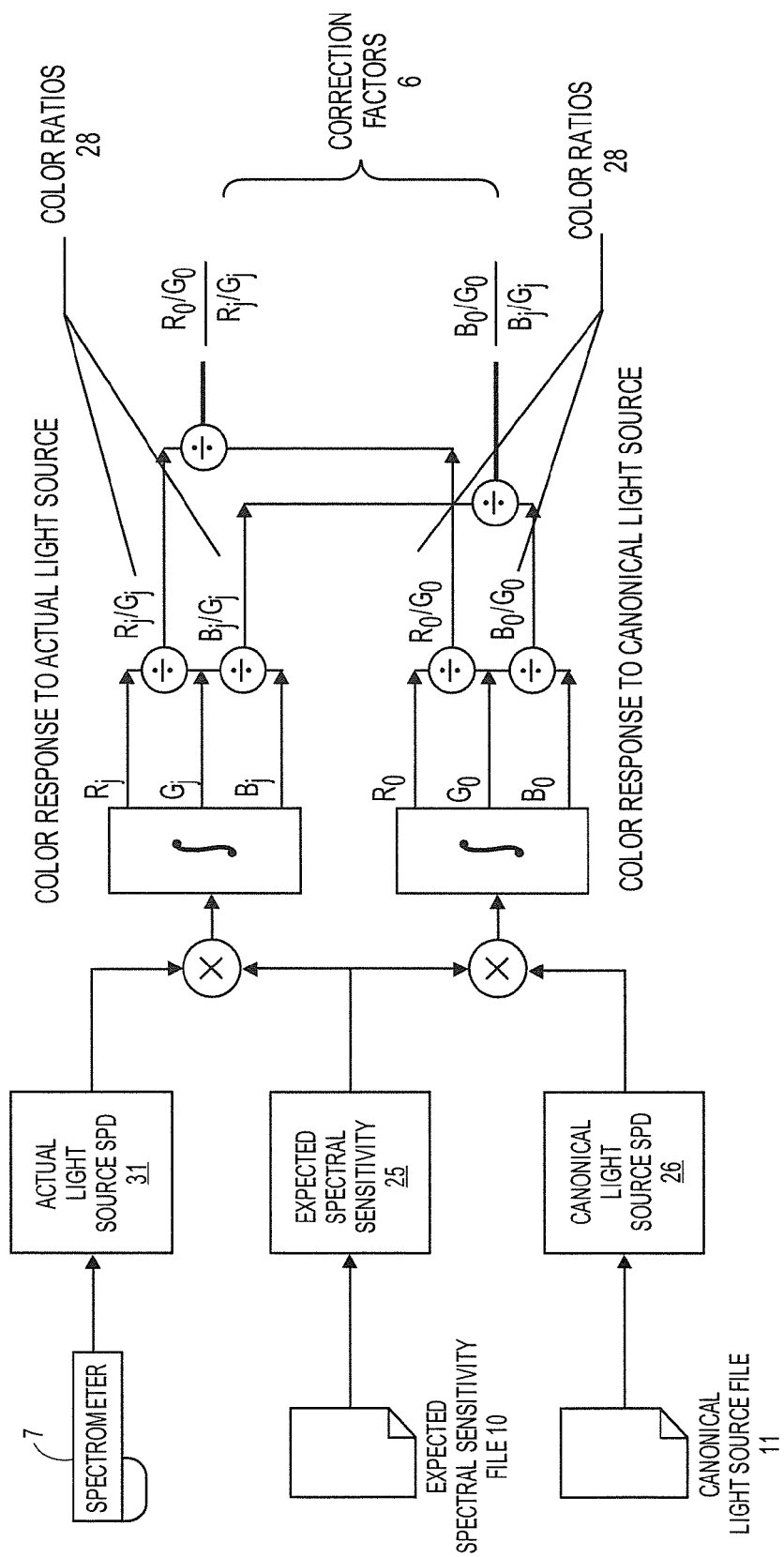
FIG. 3 is a flowchart of a process for calculating correction factors, in accordance with embodiments of the invention.

In block 21, a color response to the actual light source 13 is computed based on the expected spectral sensitivities and the power spectrum of the actual light source 13. FIG. 3 shows a flowchart of an example of how color response to the actual light source 13 may be calculated. Expected spectral sensitivities 25 are predetermined and obtained from reading an expected spectral sensitivity file 10. An actual light source SPD 31 is obtained from reading a spectrometer 7 that is exposed to an actual light source 13. For each color channel, the expected spectral sensitivity 25 of the color channel is multiplied by the actual light source SPD 31 and integrated to obtain $R_j$, $G_j$, and $B_j$ values, which are divided to yield color ratios 28 $R_j/G_j$ and $B_j/G_j$.

Now referring back to FIG. 2, in block 22, a color response to the canonical light source is computed based on the expected spectral sensitivities and the power spectrum of the canonical light source. FIG. 3 shows a flowchart of an example of how this color response may be calculated. Expected spectral sensitivities 25 are predetermined and obtained from reading an expected spectral sensitivity file 10. The canonical light source SPD 26 is also predetermined and obtained by reading a canonical light source file 11. For each color channel, the expected spectral sensitivity 25 of the color channel is multiplied by the canonical light source SPD 26 and integrated to obtain $R_0$, $G_0$, and $B_0$ values, which are divided to yield color ratios 28 $R_0/G_0$ and $B_0/G_0$.

Figure 4A:
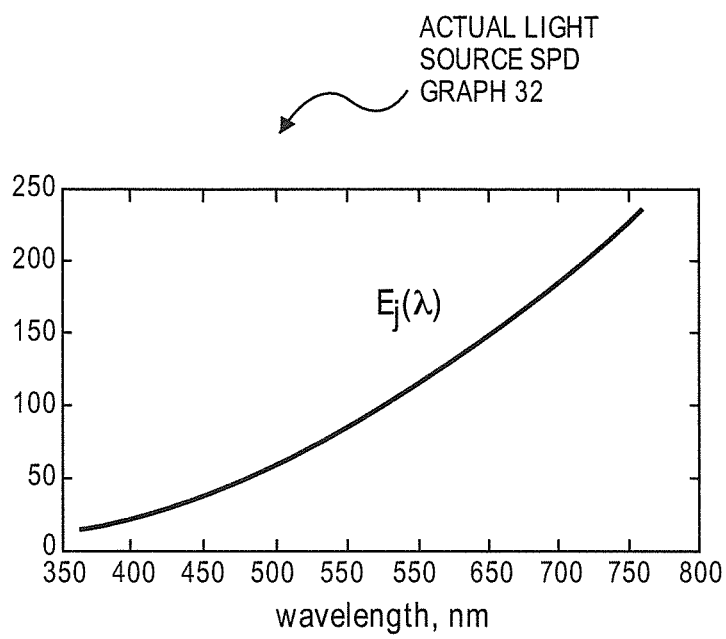
FIGS. 4A-4C are examples of graphs and formulas used for calculating correction factors, in accordance with embodiments of the invention.
Figure 4B:
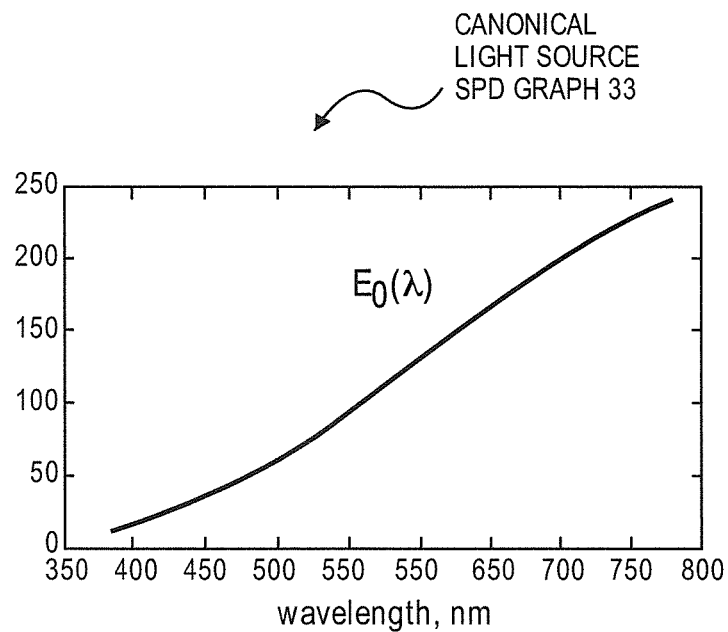
Figure 4C:
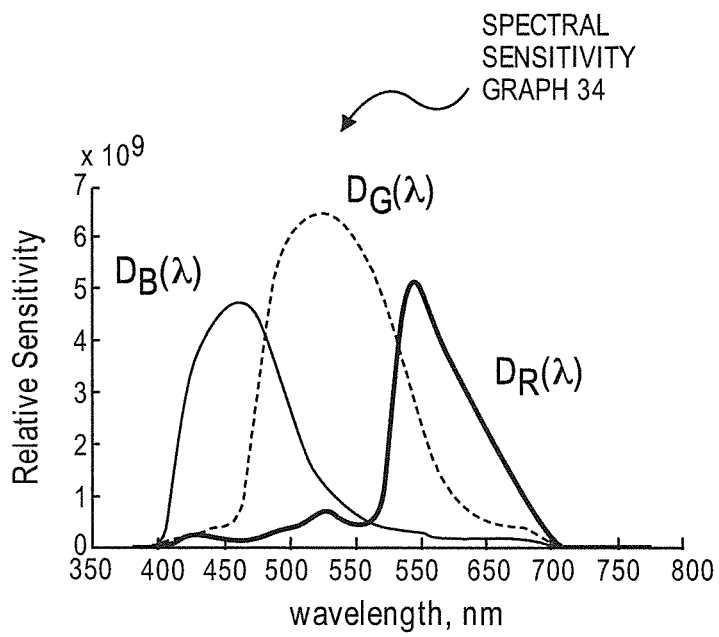

FIGS. 4A-4C show examples of more detailed formulas and graphs for calculating color response to a light source based on spectral power distribution of a light source and expected spectral sensitivities of a camera module 2. Graph 32 plots the SPD function of light emitted by an actual light source 13 (denoted as $E_j(\lambda)$). Graph 33 plots the SPD function of light emitted by a canonical light source (denoted as $E_0(\lambda)$). Graph 34 plots the expected spectral sensitivities of an RGB camera module 2. $D_R(\lambda)$, $D_G(\lambda)$, and $D_B(\lambda)$ are spectral sensitivity functions for color components R, G, and B respectively. Color response to a light source may be computed by multiplying and integrating (or summing) the SPD of a light source and the expected spectral sensitivity, for each color component or channel. For example, equations 36-38 show how each color component value of a color response to an actual light source 30 may be calculated, where $R_j$, $G_j$, and $B_j$ are the R, G, and B components of a color response to an actual light source respectively. Similarly, equations 39-41 show how each color component value of a color response to a canonical light source 35 may be calculated, where $R_0$, $G_0$, and $B_0$ values are the R, G, and B components of a color response to a canonical light source respectively. These values may then be used to compute color ratios 28, $R_j/G_j$ and $B_j/G_j$, for a response to an actual light source 13 and color ratios 28, $R_0/G_0$ and $B_0/G_0$, for a response to a canonical light source.

Now referring back to FIG. 2, in block 23, a correction factor 6 is computed, here as the ratio of a color response to a canonical light source and a corresponding color response to an actual light source 13. Referring now to FIG. 3, a correction factor 6 may be calculated for each color ratio 28 (e.g., one for R/G and another for B/G). For example, in FIG. 3 two correction factors 6 are computed as $(R_0/G_0)/(R_j/G_j)$ and $(B_0/G_0)/(B_j/G_j)$; these are also depicted in FIGS. 4A-4C.

Still referring to FIG. 2, in block 24, a measured response of the DUT 2 is adjusted using the correction factor 6. In one embodiment, the measured response of a DUT 2 may be the color response (e.g., color ratios) computed from a digital image captured by the DUT 2 while exposed to an actual light source 13. These "measured" or raw color ratios are then adjusted using the correction factors 6. For example, the raw color ratios may be multiplied by their respective correction factors 6 to obtain corrected color ratios. The corrected color ratios are expected to be those had the DUT 2 captured while being exposed to a canonical light source instead of the actual light source 13. Other measures of how a DUT 2 responds to color may be adjusted using a correction factor as well.

The corrected measured response of the DUT 2, or the correction factors 6 and the measured color response data as well as perhaps other calibration data, may then be stored or written into a suitable storage as being associated with the DUT 2 (e.g., non-volatile memory within the DUT 2 such as memory 3—see FIG. 1, remote server or cloud-based storage that is accessible over the Internet by the DUT 2 or by a device in which the DUT 2 is integrated). Firmware running in the DUT 2 (or in another device of which the DUT 2 will be a component) can then read the stored, calibration data and/or the corrected measured color response and then use it to make corrections to images captured by the DUT 2 during in-the-field or end-user operation. The difference between the corrected response of the DUT 2 and the corrected response of an "ideal" camera module will adjust the images captured by the DUT 2 such that the DUT 2 produces images that are essentially equivalent from the standpoint of color response to that of the "ideal" module. Using the corrected response may essentially eliminate or substantially reduce any differences in response caused by differences in light sources used to calibrate various instances of the DUT 2.

Referring back to FIG. 1, the system 1 may be part of a high volume manufacturing production test line for camera devices, e.g., camera modules that are integrated into consumer electronics devices such as smart phones. A camera DUT (e.g., camera module) 2 is exposed to an actual light source 13. A traceable, calibrated light measurement device, such as a colorimeter or a spectrometer (collectively referred to here as a "spectrometer") 7 may measure the power spectrum of light emitted by an actual light source 13 and send the data to a data analyzer 9. The data analyzer 9 may read the predetermined power spectrum of a canonical light source from a canonical light source file 11. The data analyzer 9 may also read the predetermined spectral sensitivity of a principal camera device from an expected spectral sensitivity file 10. The data analyzer 9 may calculate correction factors 6, for example, by using the correction factor calculations described above.

The camera module 2 is also operatively connected to an image analyzer 4, using a data cable or wireless technology, so that image analyzer 4 can receive digital image data of an image taken by camera module 2. The camera module 2 may capture an image 17 and send it to the image analyzer 4. The image analyzer 4 can calculate the measured or raw color response from the image 17. In one embodiment, the color response is the raw color ratios 15 ($R_r/G_r$ and $B_r/G_r$) of the image 17. The raw color ratios 15 may then be corrected using the computed correction factors 6. In one embodiment the raw color ratios 15 are multiplied by their respective correction factors 6 using a multiplier module 14 to obtain corrected color ratios 16 ($R_c/G_c$ and $B_c/G_c$). The corrected color ratios 16 may then be used by the camera module 2 to improve the color content of images during end-user or in-the-field image capture. In one embodiment, the corrected color ratios 16 are stored in non-volatile memory, e.g., the memory 3, of the camera module 2. This module calibration loop or process 5 may be repeated to calibrate multiple camera modules 2 using the same set of correction factors 6, in a high volume manufacturing setting.

In some embodiments, the actual light source 13 may be calibrated to essentially match the color temperature of the canonical light source prior to calibration. Matching the temperature of the actual light source 13 to the temperature of the canonical light source prior to calibration may produce more accurate and consistent camera response calibration. FIG. 1 shows an example system 1 with a light source calibration loop or process 50 that may be used to calibrate the actual light source 13. In some embodiments, light source calibration may be performed by adjusting the voltage level supplied by a power supply 49 that is operatively connected to the light source 13. The color temperature of the light source 13 may be adjusted by changing the voltage level applied to the light source 13. A spectrometer 7 may be used to measure the current color temperature of the actual light source 13. This data may be sent to the data analyzer 9 (see FIG. 1). The data analyzer 9 may compare the measured color temperature of the light emitted by the actual light source 13 with a predetermined color temperature for the canonical light source, and in response signal a controller 48 to automatically adjust the voltage supplied by the power supply 49 accordingly. In another embodiment, the actual light source 13 may have a built-in control to adjust the color temperature setting. Other mechanisms for adjusting color temperature of a light source are contemplated as well. This light source calibration loop or process 50 may be repeated periodically to adjust the color temperature of the actual light source 13. For example, in one embodiment, light source calibration is performed every 24 hours.

An advantage of the processes and systems described in this document is that color response calibration may be performed more accurately and consistently because embodiments of the invention compensate for variations in the light spectra emitted by different light sources used during camera device calibration. Moreover, because embodiments of the invention compensate for variations in light sources, laborious material screening procedures for light sources may be avoided.

Figure 5:
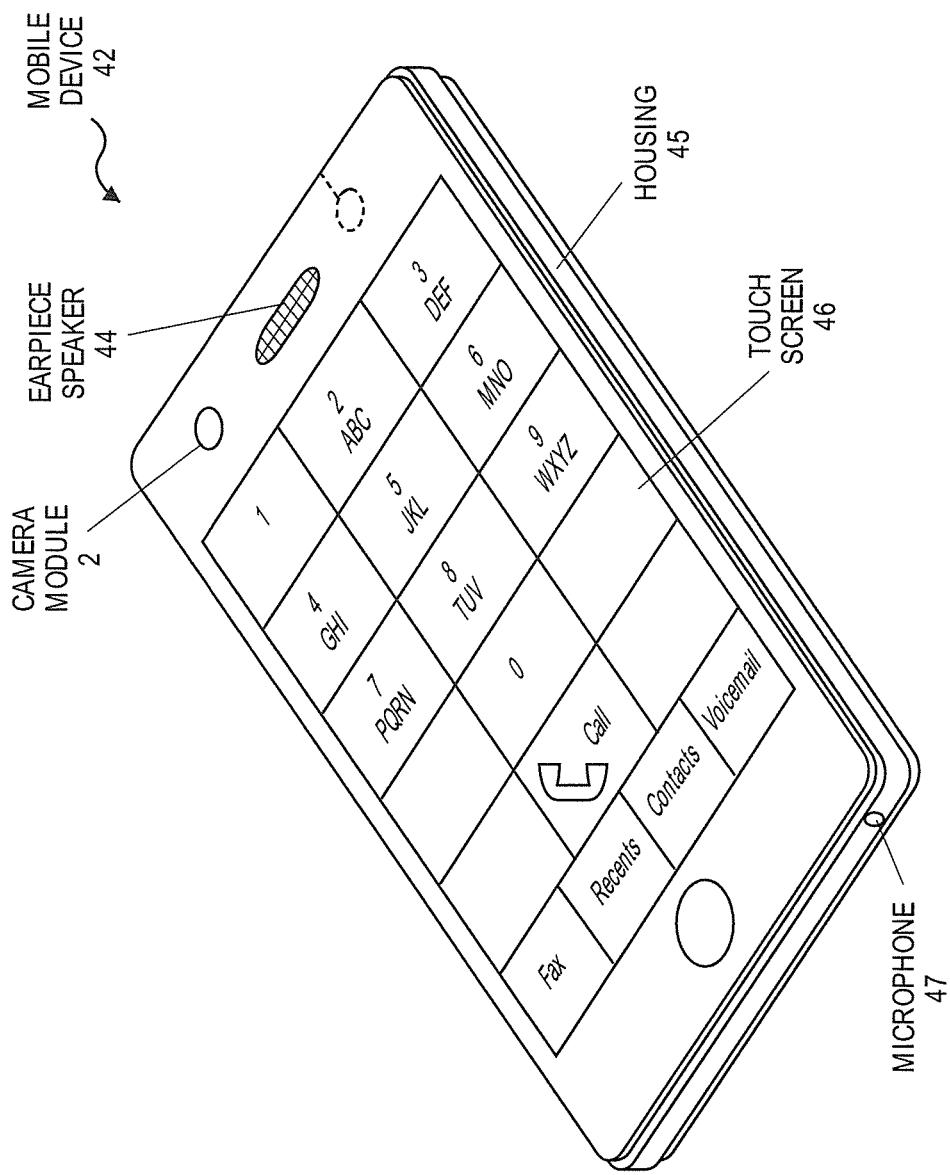
FIG. 5 depicts an example of a mobile device in which a camera module can be integrated.

It should be understood that the camera module 2 could be incorporated on a wide variety of consumer electronic devices such as desktop computers, laptops, tablets, home entertainment systems, vehicle-based imaging systems, smartphones, professional cameras, and other suitable devices (e.g., security systems, and mounted cameras). FIG. 5 shows an example of a personal mobile device 42 in which a camera module 2 may be incorporated. The camera module 2 may be calibrated while in the housing of the mobile device or separately, such as prior to installation into the device 42. Also, it should be understood that the processes and systems described in this document may be applied to a mass production manufacturing test line to calibrate the response of camera modules 2 during manufacture.

It is also considered that the processes and systems mentioned herein may be embodied in an article of manufacture having a computer-readable medium in which data and instructions are stored that cause a programmable processor to perform operations described above. Some examples of computer-readable mediums are flash drives, USB drives, DVDs, CD-ROM disks, and hard disk drives. A test program may cause a test computer or other device to: calibrate a light source, read light source spectral files, calibrate a spectrometer 7; read data from a spectrometer 7 measurement; read spectral sensitivity data from a file; compute color response of a digital image 17 captured by a DUT 2; compute color response to an actual light source 13; compute a color response to a canonical light source; compute a correction factor 6; compute corrected color ratios 16; and write corrected color ratios 16 to camera memory 3.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art.

What is claimed is:

1. A method for calibrating the response of a camera device under test (DUT), that images an actual light source, comprising:

computing a color response to a canonical light source, based on a) an expected spectral sensitivity and b) a power spectrum for the canonical light source;

computing a color response to the actual light source, based on a) the expected spectral sensitivity and b) a power spectrum of the actual light source;

computing a correction factor as a function of a) the color response to the canonical light source and b) the color response to the actual light source measuring a color response of the DUT to the actual light source; and adjusting the measured color response of the DUT using the correction factor.

2. The method of claim 1 wherein the power spectrum is a spectral power distribution.

3. The method of claim 1 further comprising obtaining the power spectrum of the actual light source, by reading from a spectrometer that is exposed to the actual light source.

4. The method of claim 1 further comprising obtaining the expected spectral sensitivity, by analyzing a digital image captured by a principal camera device as illuminated by a monochromatic light source.

5. The method of claim 4 wherein the principal device is a camera device that has been selected as a measure of the central tendency of a statistical distribution of camera devices.

6. The method of claim 1 wherein measuring the color response of the DUT comprises computing a color response ratio of different pixel color components, captured by the DUT while exposed to the actual light source, and wherein adjusting the color response of the DUT comprises multiplying the color response ratio by the correction factor.

7. The method of claim 1 further comprising storing the adjusted color response in non-volatile memory associated with the DUT.

8. The method of claim 6 wherein the DUT is an RGB camera module and the color response ratio of the DUT comprises color ratios R/G and B/G.

9. The method of claim 1 wherein computing a color response to the canonical light source comprises multiplying and integrating, for each color channel, the power spectrum for the canonical light source and the expected spectral sensitivity of the color channel.

10. The method of claim 1 wherein computing a color response to the actual light source comprises multiplying and integrating, for each color channel, the power spectrum of the actual light source and the expected spectral sensitivity of the color channel.

11. The method of claim 1 further comprising:
obtaining the power spectrum for the canonical light source, by deriving it from a measured power spectrum of one of a tungsten incandescent lamp, a simulated daylight lamp, or other actual lamp that is similar to the one contained in the actual light source.

12. The method of claim 1 further comprising adjusting the actual light source to have essentially the same color temperature setting as that of a lamp that is used to derive the power spectrum for the canonical light source.

13. A system for calibrating a color response of a camera device comprising:
an actual light source to which the camera device is to be exposed during image capture;
an image analyzer to measure a color response of the camera device to the actual light source; and
a data analyzer to calculate a correction factor to be used to correct the measured color response of the camera device, wherein the correction factor is computed as a function of a) color response to a canonical light source and b) color response to the actual light source.

14. The system of claim 13 wherein the actual light source has an adjustable color temperature setting that is set to be essentially the same as that of a lamp used when deriving a power spectrum for the canonical light source.

15. The system of claim 13 wherein the data analyzer is to compute the color response to the canonical light source by multiplying and integrating, for each color channel, a) an expected spectral sensitivity in the color channel and b) a power spectrum that has been derived from an actual power spectrum measurement of a lamp that is similar to the one contained in the actual light source.

16. The system of claim 15 further comprising:
a spectrometer to measure a power spectrum of light emitted by the actual light source,
wherein the data analyzer is to compute the color response to the actual light source by multiplying and integrating, for each color channel, the measured power spectrum of the actual light source and the expected spectral sensitivity in the color channel.

17. An apparatus for testing a camera device, comprising:
an article of manufacture having a machine-readable medium in which are stored instructions that program a computer to access files that contain power spectrum data for a canonical light source, power spectrum data of an actual light source, and expected spectral sensitivity data for the camera device,
wherein the instructions further program the computer to compute a camera response to the canonical light source based on a) the expected spectral sensitivity data and b) the power spectrum data for the canonical light source, and a camera response to the actual light source based on a) the expected spectral sensitivity data and b) the power spectrum data of the actual light source,
wherein the instructions further program the computer to compute a correction factor by calculating a ratio of a) the camera response to the canonical light source and b) the camera response to the actual light source, and apply the correction factor to adjust a measured response of the camera device, wherein the measured response is computed from an image captured by the camera device while exposed to the actual light source.

18. The article of manufacture of claim 17 wherein the instructions are such that the computed camera response to the canonical light source comprises a color response ratio of different pixel color components.

19. The article of manufacture of claim 17 further comprising stored instructions that program the computer to write the adjusted measured response of the camera device into non-volatile memory associated with the camera device.

20. The article of manufacture of claim 17 wherein the instructions are such that the measured response of the camera device is a computed color response ratio of different pixel color components that are derived from the image captured by the camera device while exposed to the actual light source.

* * * * *